July 12, 1960
B. F. ANTHON
2,944,356
TRANSPARENCY EQUIPMENT
Filed March 19, 1956
3 Sheets-Sheet 2
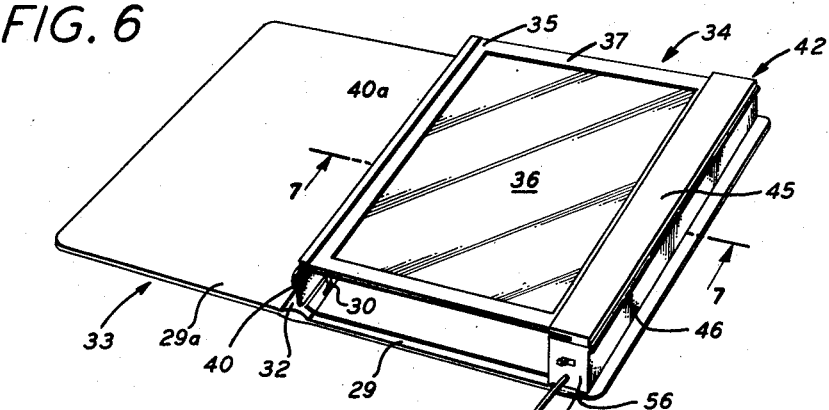
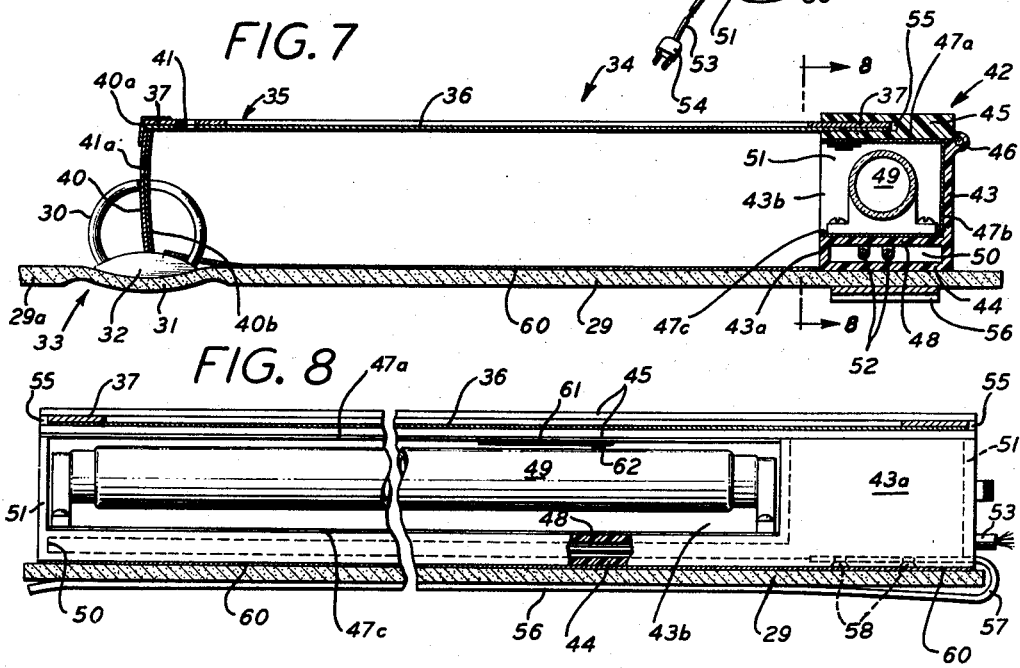
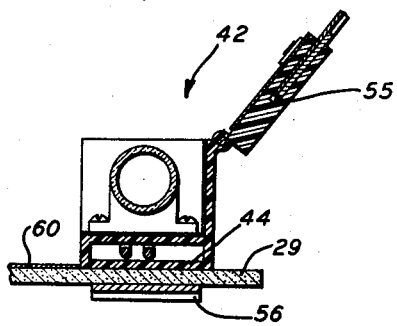
BORWIN F. ANTHON,
INVENTOR.
BY George R. Bliss July 12, 1960  B. F. ANTHON  2,944,356
TRANSPARENCY EQUIPMENT
Filed March 19, 1956  3 Sheets-Sheet 3

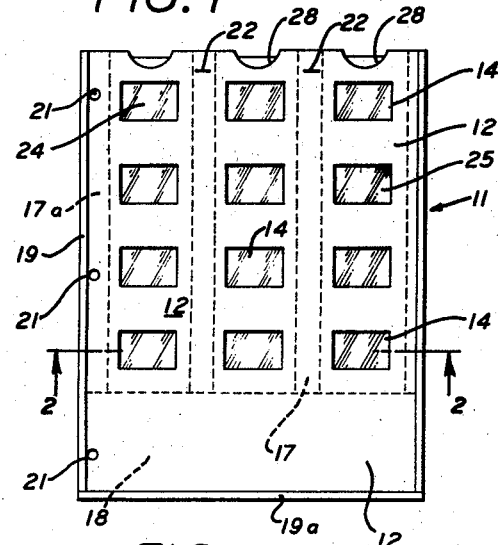
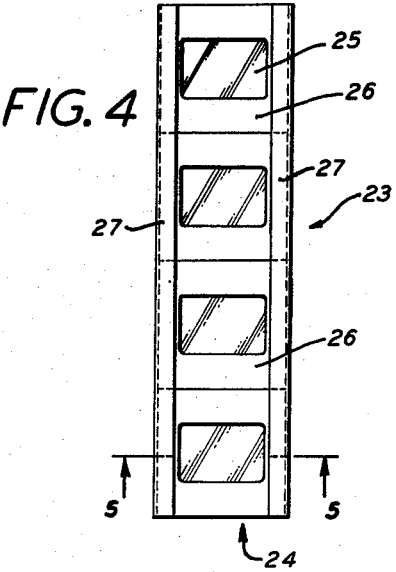
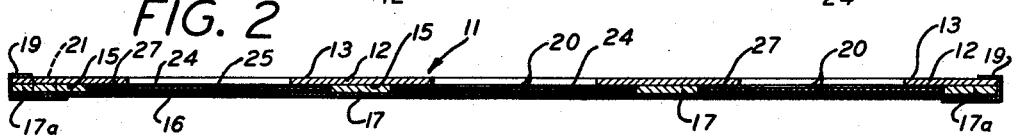
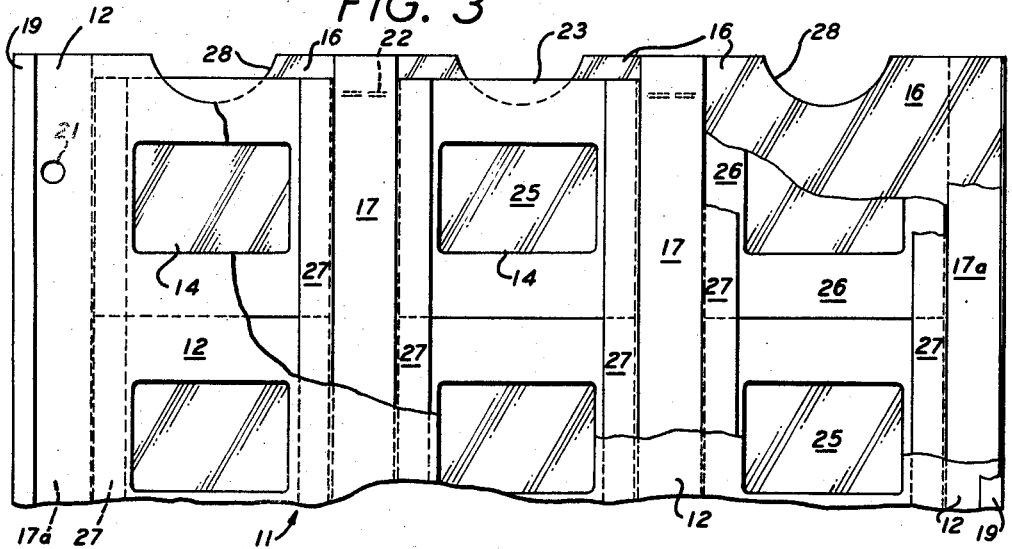
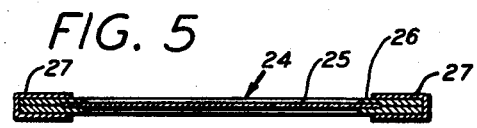
BORWIN F. ANTHON,
INVENTOR.

BORWIN F. ANTHON,
INVENTOR.

BY George M. Bliss

United States Patent Office 2,944,356
Patented July 12, 1960

2,944,356
TRANSPARENCY EQUIPMENT
Borwin F. Anthon, 7596 Mulholland Drive, Los Angeles, Calif.
Filed Mar. 19, 1956, Ser. No. 572,491
6 Claims. (Cl. 40—106.1)

This invention relates to equipment for filing and equipment for viewing photographic or other transparencies. It particularly relates to a combination transparency file and viewer.

One object of the invention is to provide an improved leaf or folio for a loose leaf binder file for transparencies, which will hold a large number of transparencies in a manner affording them protection from damage, and convenient for ready examination and identification.

Another object is to provide a filing device which will enable the transparencies to be readily placed and removed therefrom and to be readily handled during projection.

It is another object to provide a viewing device which may be used both with or without the loose leaf filing device for ready viewing of the transparencies, and if used with the filing device, then with or without removal of the folio from the binder.

It is still another object of the invention to provide a viewer with an improved illuminator which will evenly and brilliantly illuminate all portions of a large transparency or a large sheet holding many small transparencies.

And another object of the invention is to provide devices capable of achieving the objects above stated in structures of economical construction, and of attractive appearance, which are sturdy and durable, and convenient to handle.

In the drawings which are for illustrative purposes only, and in the specifications, are shown and described the several features of the invention, some of which may be used independently of one or more of the other features, either as separate devices or in combination with other devices not herein shown and described. All of the features of the invention are capable of combination in a co-operative whole. The invention, either as to each feature, or as to the entire combination, is not confined, as to its embodiment, to the particular device or combination of devices shown and described, but is limited in its scope solely by the language of the definitions set forth in the appended claims.

In the drawings,

Figure 1 is a top plan view of a leaf assembly such as is a feature of the filing means of the invention.

Figure 2 is a sectional view of this leaf assembly taken along the line 2—2 of Figure 1, and on an enlarged scale.

Figure 3 is a fragmentary top plan view of the leaf assembly, with parts broken away to better show the inner structure of the leaf assembly, and on the same scale as Figure 2.

Figure 4 is a view of a slide holder for several transparencies which is a part of the leaf assembly, using a scale intermediate those of Figures 1 and 3.

Figure 5 is a section along line 5—5 of Figure 4, and on an enlarged scale.

Figure 6 is a perspective view of the viewer of the invention shown assembled with a loose leaf binder (no leaves shown).

Figure 7 is a vertical section taken along the line 7—7 of Figure 6.

Figure 8 is a sectional view taken along the line 8—8 of Figure 7.

Figure 9 is a fragmentary sectional view similar to Figure 8 with the lamp case cover open.

Figure 10:
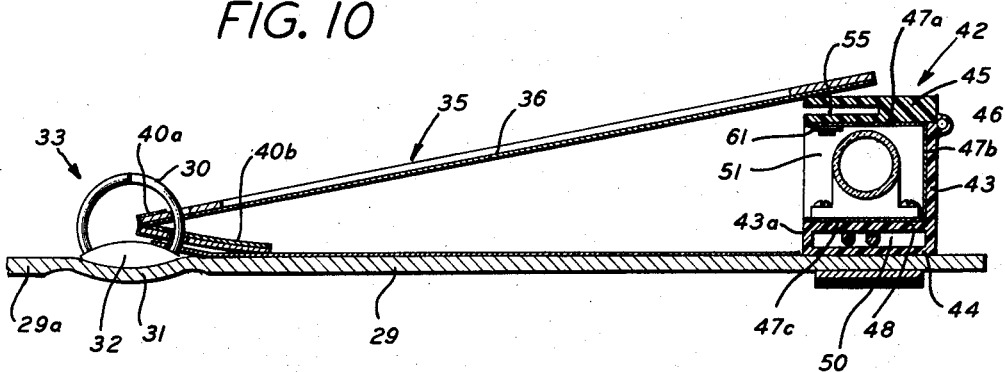
Figure 10 is a sectional view similar to Figure 9, but with the viewer plate shown in a different position relative to its associated parts.

Figure 1 shows a leaf or folio 11 designed to hold in assembled relationship a plurality of photographic transparencies. The leaf is designed particularly for being filed in a loose leaf binder of the conventional type, but may be otherwise stored with other such leaves, if desired. The leaf shown in the drawings is constructed to hold twelve transparencies in three vertical rows of four each.

Each folio comprises a top plate 12 and a bottom plate 16 (see Figure 2) suitably bound together, as by tape 19 along their lateral edges and tape 19a along the lower edge. The plate 12 is preferably made of stiff paperboard which is preferably rendered dark colored or black on its outside surface 13 by paint or otherwise. Its inside surface 15 is preferably gray or of some similar neutral color. It is formed with apertures or windows 14 arranged in a plurality of vertical rows as shown in Figure 1.

The bottom plate 16 which may be of the same shape and size as plate 12 and bound to it in transverse registry therewith, is preferably a continuous, unbroken relatively stiff thin sheet of plastic material, such as methyl methacrylate. This plastic plate 12 has a "smooth" mirror-like surface on its outside face, readily permeable by light rays which are not broken up in passage therethrough. The inside surface is roughened as by fine sand blasting or other means to produce what is commonly termed a "frosted" surface, which receives the light rays entering the body of the sheet through the smooth outside surface and passing therethrough, and diffuses them. Each point on the frosted surface may be conceived as receiving a light ray and breaking it into a plurality of rays which proceed on from its surface in many directions to objects beyond the frosted surface. The terms "smooth" and "frosted" as applied also to similar items described below shall be understood to have the meanings above explained. A light-permeable sheeted body (as distinguished from an opaque body) with both surfaces "smooth" and smoothly and continuously coalescing particles therebetween is commonly termed "transparent," and this word is so used herein. A light-permeable body which has one or more surfaces "frosted" or the interior particles of which are not so related, is only partly transparent and is commonly termed "translucent" and this word is so used herein.

Longitudinally arranged narrow spacer strips 17 and 17a disposed contactually between the plates 12 and 13 extend from the upper edge of the leaf downwardly, preferably only part way to the lower edge of the leaf. These strips are of paperboard or other suitable material and are preferably light colored, white or off white, at least on their outside surface which lies against the plate 16. Strips 17 are intermediate of the lateral edges of the folio. Strips 17a are along the lateral edges respectively of the folio. A spacer sheet 18 of similar material is arranged below the strips 17 and 17a abutting the ends of the strips 17, and 17a and extending from one lateral edge of the folio to the other, and downwardly to the lower edge thereof. The strips 17, 17a and sheet 18 serve both to space the top and bottom plates 12 and 16 a predetermined distance from each other, and also divide the void between these two plates into several elongated rectangular slideway voids 20 for the reception of the transparency holders 23 pictured in Figure 4. Each slideway is of the thickness, width and length to snugly receive and retain one of the transparency holders 23.

As stated above, the top and bottom plates 12 and 16 are bound together with the strips 17, 17a and sheet 18 contactually between them by suitable means such as the preferably black binder tape 19 along their edges, the binder tape 19a at their lower edges, and also by staple fasteners 22 to prevent spreading apart of the plates at the top of the folio near the open ends of the slideways along the upper edge of the folio. Obviously the spacer construction shown and described may have modifications. Thus the spacer strips 17, and 17a and sheet 18 can be one integral pasteboard sheet machine-cut in one operation.

The top and bottom plates of the folio and lefthand lateral edge spacer strip 17a are registeringly perforated at 21, 21, 21, for the reception of the usual three rings of a loose leaf binder book, as will be described below. The upper edges of the plates 12 and 16 are registeringly, arcuately cut away at 28, 28, 28 to provide finger grip notches for facilitating the removal of the transparency holders 23 from the slideways 20.

The transparency holders 23 each comprise several conventional framed transparencies 24 held together in a strip assembly by a pair of preferably metal, U-shaped strips 27, one along each edge of the framed transparencies. The strips 27 serve both to frictionally grip and hold the framed transparencies in an assembled row, and also to protect the easily deformed edges of the pasteboard frames 26 of the framed transparencies 24. Each framed transparency 24 consists of a photographic film 25 framed in an opaque paperboard binder 26. These framed transparencies are of conventional construction and are standard photographic articles of commerce. The paperboard frame often is made by compressing together two identically shaped and sized rectangular pieces with identically shaped and sized rectangular apertures centrally disposed therein, with the photographic film lying between them. The central aperture of the laminated rectangular paperboard frame 26 is slightly smaller than the photographic film 25, both as to width and length, as shown in Figure 5.

To store and file still-picture transparencies, they are slipped edgewise in to the open slotted inside edge of one of the U-shaped metal strips 27, with the upper and lower edges of longitudinally adjacent framed transparencies in abutting contact. Another strip 27 is then slipped over the opposite lateral edges of these transparencies, thus providing a transparency holder 23. As shown in the drawing each of these holders comprises four transparencies. They should, of course, be assembled with the sensitized face of the film downward, and the upper portion of the photographic scene uppermost for proper viewing and ready and proper placement in a projector. The resilient nature of the metal of the connecting back and sides of the U-shaped strips 27, causes the transparencies to be held securely, but removably in place.

The strips 27 are then inserted in the folio guideways 20, and the folios may then be placed in position on the loose leaf binder rings each with its black side facing in that direction which is downward when the folio is lying on the lefthand cover of the binder with the finger notches uppermost.

In Figures 6 to 11 is shown a loose leaf binder 33 or parts thereof, of one of the conventional types of such binders available to purchasers. This binder is shown in combination with a viewer which is a feature of this invention, arranged for viewing transparencies of different kinds, including transparencies assembled in folios as above described, or for other uses of a similar nature. Such a conventional binder has the several parts shown in the drawings, or the functional equivalents thereof. Such parts are the two covers 29 and 29a, the flexible connecting hinge strip 31, a metal bar 32 suitably secured to the strip 31, and the several split rings 30, the two halves of which are resiliently mounted in the bar 32 for spreading separation of the two halves at their upper ends for removal of the folios, or for contact of these ends for retention of the folios in book-like assembly, all in the conventional manner. Figures 6 to 9 show the binder used in combination with an illuminable viewing box 34, upon the upper cover plate 35 of which, transparencies, photographic or otherwise, may be laid for viewing. If such transparencies are one of the folios 11, normally filed in the binder 33, they are removed from the binder separately by disengagement from the rings 30 and placed on top of the box 34 and later returned to the binder. Other transparencies of single scenes or a plurality of suitably assembled scenes varying in size up to the size of the cover plate 35, may be similarly placed for viewing. Transparent or translucent tracing paper and a nether at least partially transparent sheet of a drawing or other indicia to be copies, may be similarly placed on the cover plate, and suitably fastened thereon for making tracing copies of the drawing or indicia.

The viewing box 34 has a cover plate 35, a sidewall 40, which appears at the left hand edge of the cover plate in the drawing, and a lamp case 42 at the right hand edge of the cover plate. The lamp box is preferably detachable from the cover plate. The left sidewall 40 is preferably, although not necessarily, hinged to the left edge of the cover plate. This hinged relationship is provided in the construction shown in the drawing, by means of a tape 40a of flexible material.

The cover plate 35 consists of a frosted translucent pane 36 of plastic or other suitable material, and a stiff preferably opaque frame 37 for the pane. The pane is preferably frosted on its nether surface. The frame is preferably black on its upper surface and secured to the pane in any suitable manner. The pane and frame may be of one integral piece of translucent plastic or other similar material preferably colored black around its margin, and preferably hinged at its lefthand side to the sidewall 40.

The sidewall 40 is faced with a material providing a light-reflecting mirror-like inwardly facing surface 40b, which throws light trays impinging upon it into the interior space of the box. The left sidewall may be slightly cylindrical, its surface being centered about a horizontal axis line which is directly and slightly above the axis of the lamp case 42, with the result that the light rays originating from the lamp case are mostly reflected upwardly against the under side of the pane 36. This tends to correct imperfect illumination of the lefthand side of the pane 36 due to its relatively greater distance from the lamp case.

The cover plate is perforated at 41 and the sidewall 40 is perforated at 41a to register with the rings 30, of a loose leaf binder, to enable the cover plate and sidewall of the viewing box 34 to be mounted as shown in Figure 10 for use in a manner which will be later explained.

It will be observed that, while the cover plate and sidewall on the one hand and the lamp case on the other are preferably mechanically separable from each other, they are functionally related to form a viewing box, which may be used separately from a loose leaf binder, or may be used in assembly with a binder as shown in Figures 6, 7, 8 and 10. When used in assembly with the binder they may be assembled as shown in Figures 6, 7 and 8, with the cover plate horizontal, and the sidewall substantially vertical. Or they may be assembled on the binder with the cover plate inclined downwardly and inwardly of the binder as shown in Figure 10.

In the former case, the cover plate and sidewall are not hinged on the binder rings. In the latter case, the cover plate and side wall are in collapsed position and are hinged on the binder rings. In the former case, the side wall 40 rests at its lower edge on the connecting strip 31, 32 of the binder and is held in upright position by and between the adjacent associated ends of the several pairs of binder rings 30. In the latter case, the reflector surface 40b reflects light rays from the lamp box slantingly upwardly to the right against the under side of the translucent pane 36, tending to correct imperfect illumination of the left hand side of the pane because of its distance from the lamp case.

Figure 11:
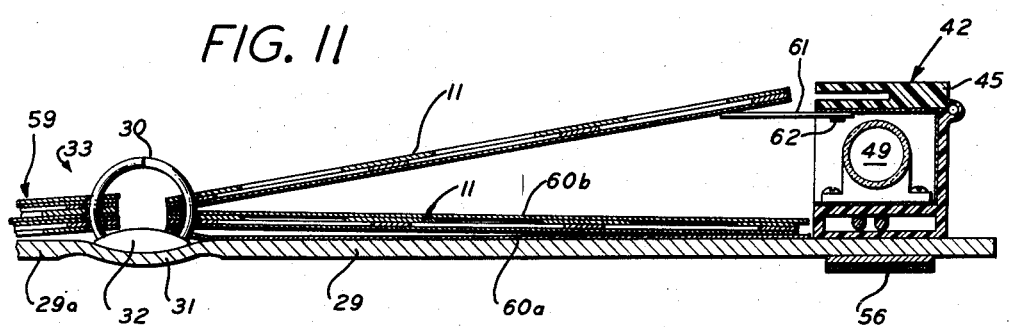
Figure 11 is a sectional view similar to Figure 10, but with the viewer plate omitted and showing the loose leaf binder and the folio leaves arranged for viewing the folio leaves.

A sheet 60 of white or other relatively brilliantly colored paper or similar material lies on the bottom of the viewer box when the box is assembled as shown in Figures 6 to 10, inclusive, in all of which assemblies, the transparency is laid on top of the cover plate of the box. When the cover plate 35 is omitted as is the case in the assembly shown in Figure 11, the folios are directly viewed without the interposition or use in any way of the cover plate 35. The folios are successively turned on the binder rings from their left hand position in the binder as shown at 59 in Figure 11 over to the right hand side, where they are temporarily held in a position for viewing and after viewing are dropped to a horizontal position on top of the right hand loose leaf cover 29 as will be explained below. It follows that in this assembly and arrangement the folios 11, must be interleaved with sheets 60a, 60b, 60c etc., like sheet 60 as shown in Figure 11, so that as each successive folio is viewed it will have the aid of an associated sheet of white or brilliantly colored paper to turn all rays up against the transparencies which are being viewed.

The lamp case 42, comprises a rear wall 43, a front wall 43a having an opening 43b therein, a bottom wall 44, a top wall 45 hinged in any suitable manner at 46 to the rear wall 43, and end walls 51. The material and means of securement of the several walls to each other in the relationship shown in the drawings, may be provided in any suitable manner. A shelf 48 parallel to, and spaced a short distance above the bottom wall 44 is secured to the lamp case. It serves as a support for a fluorescent lamp 49 and its associated transformer and other accessories. The shelf 48 may be supported on cross ribs 50 (left hand rib only shown). Current for the lamp 49 is carried from a plug connector 54 over the conductors 52 in the cable 53 through an opening in the right end wall 51 of the lamp box to the lamp through the usual fluorescent lamp accessories and an on-and-off switch (not shown). Light rays from the lamp pass through the elongated window opening 43b formed in the front wall 43a. The interior surfaces of the top wall 45, rear wall 43 and lamp support shelf wall 48 are lined with sheets of light-reflecting, mirror-like material 47a, 47b, and 47c respectively, to better direct all the illuminating rays proceeding from the fluorescent tube of the lamp 49 into the interior of the viewing box 34, for ultimate incidence upon the under surface of the pane 36.

The lamp case is detachably secured to the binder cover 29 by a spring clip 56 which extends a substantial distance along the under side of the cover 29, and is bent back upon itself at one end 57 to lie over the lamp case bottom wall 44, to which it is permanently secured by screw fasteners 58. Whenever it is desired to use the viewer on a transparency folio in a loose leaf binder, the clip is pushed over the loose leaf binder cover as shown in Figures 7 to 11. The clip may be similarly employed to secure the viewer box on any other similar flat object. Or the box may be assembled and placed with its open bottom directed downward on a table or other supporting surface, as when it is being used for making tracings.

The top wall of the lamp case is formed with a longitudinally extending horizontal slot or kerf 55 extending inwardly of the top wall partway toward the rear wall. This kerf is deep enough vertically to receive fairly snugly the right hand edge of the viewer box cover plate 35, including whatever binding the cover plate may have. Figures 6, 7 and 8 show the cover plate inserted in this kerf in the top wall of the lamp case and show the rest of the viewer box parts, and the lamp case positioned for the placement of transparency sheets or folios of several transparencies on top of the cover plate.

In Figure 11 only the lamp case of the viewer box is shown in use, the light from the lamp 49 proceeding into the space between the transparency folio 11 (shown in inclined position in the drawing) and the sheet 60b of white paper, and either directly or by reflection ultimately striking and passing upwardly through the said folio 11. Beneath the white sheet 60b is shown a precedingly viewed folio 11, lying horizontally flat on the binder cover 29, and there is also shown a sheet 60a of white paper which when the said preceding folio was being viewed was receiving light from the lamp and reflecting it upwardly through the transparencies in the folio. Any wide sheet of one or more transparencies could be similarly viewed. To support the folios in a temporarily stationary position, from which they can be readily dropped after viewing, to make ready for the viewing of the next folio as it is turned over from the left hand side of the binder, an arm 61 is pivoted at 62 to the under side of the top wall 45 of the lamp case to swing in a horizontal plane either into a position in which it is concealed by the lamp case, or a position in which it extends outwardly therefrom as shown in Figure 11 where it prevents the downward movement of a folio or similar stiff sheet of material about the binder rings 30 as a center. After each folio is viewed the arm 61 may be moved to its inner position, the folio dropped, the arm again moved outwardly and the next folio turned over a top of it for viewing. The arm 61 or other similar movable support may be designed for push button or other type of actuation to move it out of supporting engagement with the folio, with a spring actuated return to its initial position. The simple type of movable support shown in the drawing is merely illustrative in principle of this feature of the invnention.

The transparency holders 23 are adapted for use with projectors which are built to handle slides, each of which carries a plurality of pictures, as do the holders 23. This obviates the need for disassembling the transparencies in one of the holders 23, which is otherwise necsary before the transparencies can be projected.

The loose leaf binders may be filed on shelves or otherwise, with a full complement of the folios 11 bound in place between their covers, and the lamp case held by the clip 56 in assembled position on the cover 29 of the loose leaf binder. It will be observed from a perusal of Figure 11 that the depth of the lamp case or box 42 is but little greater than that of the full complement of transparency filing folios 11. The relative dimensions of lamp case and binder rings can, of course, be varied as desired, to file any given number of folios, and yet permit the filing of the assembled file and lamp case with the binder covers substantially vertically parallel on the storage shelves, giving a maximum of economy of length of shelving.

Since the upper surface of the top plate 12 of each folio 11 (the surface facing the reader in Figure 1) is preferably black, no light rays are seen by the observer looking at the folio, excepting those proceeding from the brilliantly lighted photographic or other films 25. This elimination of any distracting light coupled with the concentration of light rays from the lamp 49 on the under side of the film gives the pictures or other representations on the film a high degree of crystal clarity. The preferably black binding tape 19, 19a serves to add to this optical effect. For the same reason the frame 37 of the cover plate 34, as was stated above, and the upper surface of the top wall 45 of the lamp case 42 are preferably black or at least dark colored, as well as all other surfaces of the binder, viewing box, folios and lamp case which are within the vision range of the observer when examining the illuminated transparencies.

I claim:

1. A transparency viewer comprising in combination: an elongated lamp case along one lateral edge of the viewer; a flat stiff first sheet of frosted, light permeable, material separably connected to and extending laterally from the lamp case, beginning at a first level above the position of the lamp in said lamp case to an outer edge; an elongated strip of stiff material hinged to the frosted sheet at its outer edge and of a width to extend downwardly from the said first sheet and rest upon a supporting surface at a second level substantially at the bottom of the lamp case, said width being equal to the vertical distance between the first and second levels, the inwardly directed face of said strip having a mirroring lining for reflecting light toward the interior of the viewer; and a second sheet on said surface, said second sheet being of substantially white material, and a holding means for holding the lamp case and second sheet together in a readily detachable manner, said holding means comprising a horizontally lying, inwardly opening slot channeled in the upper portion of the lamp case and an adjacent edge of the first sheet dimensioned and adapted to slide readily in said slot.

2. A transparency viewer comprising in combination: an elongated lamp case along one lateral edge of the viewer; a flat stiff first sheet of frosted, light-permeable, material separably connected to and extending laterally from the lamp case, beginning at a first level above the position of the lamp in said lamp case to an outer edge; an elongated strip of stiff material hinged to the frosted first sheet at its outer edge and of a width to extend downwardly from the said first sheet and rest upon a supporting surface at a level substantially at the bottom of the lamp case, said width being equal to the vertical distance between the first and second levels, the inwardly directed face of said strip having a mirroring lining for reflecting light toward the interior of the viewer; and a second sheet on said surface, said second sheet being of substantially white material; and a loose leaf binder having split rings, the ends of the two halves of each of which rings are spring urged toward each other, the lamp case being along the outer edge of one of the binder covers as it lies spread out flat, and the hinged strip being disposable between the adjacent spring urged proximate ends of the two normally joined ends of the several pairs of rings of the binders.

3. A transparency viewer comprising in combination: an elongated lampcase along one lateral edge of the viewer; a flat stiff first sheet of frosted light-permeable, material separably connected to and extending laterally from the lampcase, beginning at a first level above the position of the lamp in said lampcase to an outer edge; an elongated strip of stiff material hinged to the frosted first sheet at its outer edge and of a width to extend downwardly from the said first sheet and rest upon a supporting surface at a level substantially at the bottom of the lampcase, said width being equal to the vertical distance between the first and second levels, the inwardly directed face of said strip having a mirroring lining for reflecting light toward the interior of the viewer; and a second sheet on said surface, said second sheet being of substantially white material; a loose leaf binder of the type having two stiff covers and split rings for the reception and securement of registeringly perforated sheets of material, said securing means permitting the sheets to be swung from one cover to the other as the covers lie flat on a support; means for readily detachably and laterally adjustably securing the lamp case along the outer edge of one of said covers in a position to throw the light rays inwardly of the cover, the said frosty sheet and the elongated strip hinged thereto being both perforated for registry with said split rings to permit them to fold toward each other about said hinge while disposed on said rings, the lamp case being securable to the loose leaf binder at such a laterally spaced adjustment from the split rings as to cause the said frosted sheet to be supported by an element of the lampcase, when said sheet is swung on the rings from one binder cover to the other.

4. In an assembly for viewing transparencies: an elongated lamp case having a rear wall, a bottom wall, a top wall, an elongated source of light rays mounted in the case in front of the rear wall and between the bottom wall and top wall, the front of said case being open to permit rays from the lamp to proceed inwardly and substantially horizontally through said opening, the top, rear and bottom walls of said case being surfaced with a mirroring lining; a loose leaf binder of the type having two stiff covers and folio retaining means permitting a folio to be swung over from one cover to the other as the covers lie flat on a support; and means for readily detachably and laterally adjustably securing the lamp case along the outer edge of one of said covers with the bottom wall of the lamp case in a position to throw the light rays inwardly of the said cover.

5. In an assembly for viewing transparencies: an elongated lamp case having a rear wall, a bottom wall, a top wall hinged to the upper edge of the rear wall to swing from a position overlying the bottom wall, upwardly and outwardly; an elongated source of light rays mounted in the case in front of the rear wall and between the bottom wall and closed top wall, the front of said case being open to permit rays from the lamp to proceed inwardly and laterally through said opening; a loose leaf binder of the type having two stiff covers, and folio retaining means permitting a folio to be swung over from one cover to the other as the covers lie flat on a support; and spring clamping means slidable over the bottom wall of the case longitudinally thereof, and over the lower cover transversely thereof for readily detachably clamping together the lamp case along the outer edge of one of said covers in a position fixed both vertically and horizontally to throw the light rays inwardly of said one cover.

6. The combination defined in claim 5, in which the said detachably securing means is slidably shiftable on the cover laterally to adjust the spacing of the lampcase from the folio retaining means.

References Cited in the file of this patent

UNITED STATES PATENTS

| 2,543,670 | Regensburg | Feb. 27, 1951 |
| 2,602,253 | Diamond | July 8, 1952 |

FOREIGN PATENTS

| 521,337 | Great Britain | June 15, 1939 |
| 732,506 | Great Britain | June 22, 1955 |
| 1,104,101 | France | June 8, 1955 |
| 1,112,289 | France | Mar. 12, 1956 |